Patented July 8, 1941

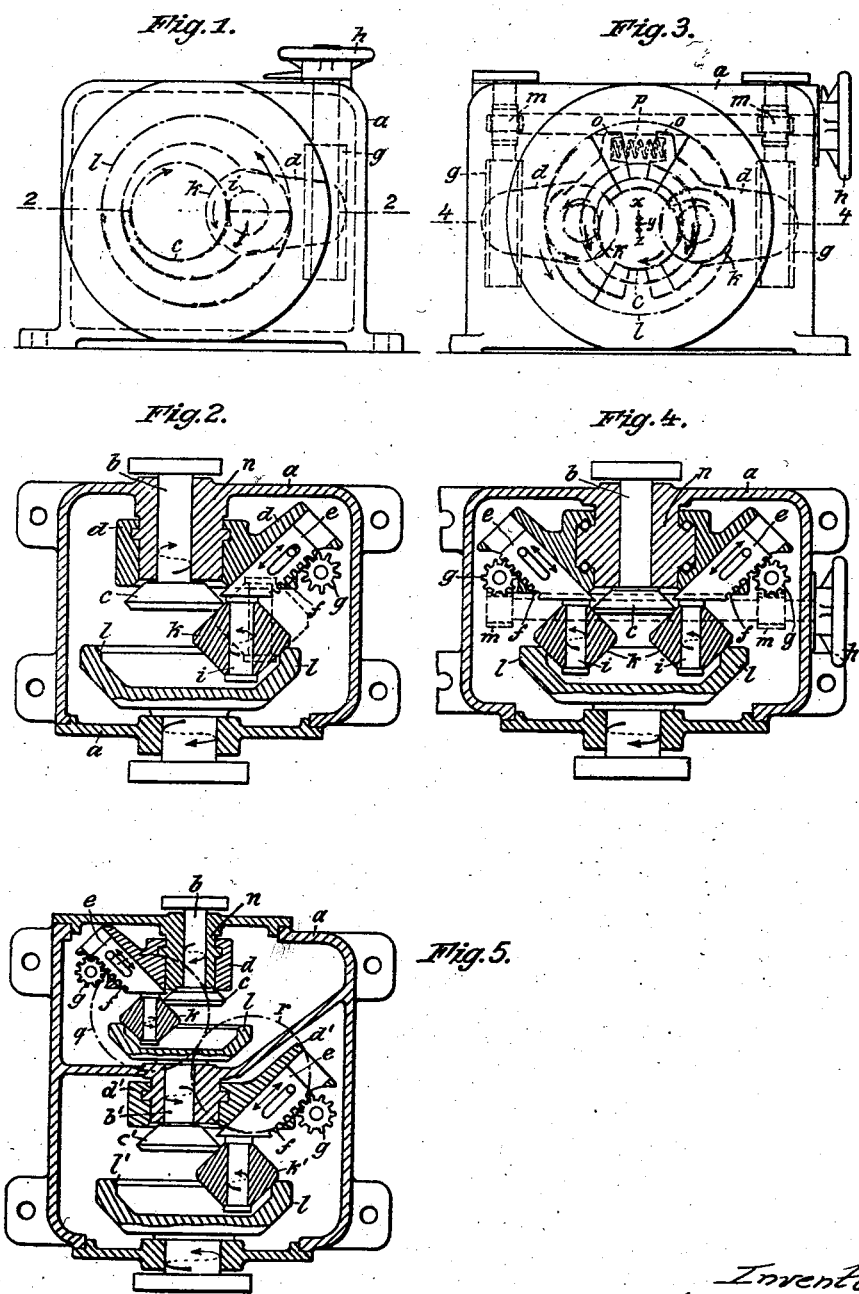

2,248,268

UNITED STATES PATENT OFFICE 2,248,268

FRICTION SPEED-CHANGE GEARING

Kurt Bär, Freital-Dresden, Germany, assignor to Firma Sächsische Armaturen Fabrik W. Michalk & Sohn, Freital-Dresden, Germany Application August 2, 1940, Serial No. 349,702
In Germany May 16, 1939

8 Claims. (Cl. 74—191)

With friction speed-change gearings the transmission is effected by means of a cone or a ball cooperating with a catch ring adjustable in the axial direction of the ball or cone in correspondence with the circumferential surface thereof in order to obtain the change of the speed. The catch ring is supported in a rocking link by means of which it can be brought into contact with, or withdrawn from, the ball or cone. The direction of motion of the catch ring is then transversely with respect to the ball or cone, that is to say, the rocking bow of the catch ring crosses the middle plane of the ball or cone.

The present improved friction speed-change gearing renders it possible to obtain a large range in the change of the speed, combined with a reliable power-transmitting pressure that increases with the strength of the power. These effects are obtained by providing the power-transmitting friction wheel with two pitches directed counter to one another, one thereof being supplied with the power and the other transmitting it. In a particualrly useful constructional form of the gearing the rocking link bearing the intermediate friction wheel is supported in the axle of the driving wheel so that it rocks concentrically therewith, whereas the wheel supplied with the power, or transmitting it respectively, is supported eccentrically with respect to the driving wheel, whereby a wedge-shaped pressure at the transmitting friction wheel is obtained in both directions of rotation and rocking between the driving wheel and the driven one.

The change of the speed can be obtained without any difficulty by a re-adjustment of the transmitting friction wheel (which is preferably designed as a double-cone) in the direction of a circumferential line of the two cones. The above-described manner of supporting the rocking member entails the advantage that an increased pressure between the contacting parts gives rise to increased transmission possibilities of the power so that no slip arises between the driving wheel and the driven wheel, or the transmitting friction wheel respectively.

With gearings of this kind a favorable relief of the bearings can be obtained if two intermediate wheels are supported separately in rocking links arranged approximately opposite to one another, and are pressed into the appertaining wedge-shaped groove by an additional power. It is in this case irrelevant in which direction the contacting wheels rotate, as both intermediate wheels are pressed compulsorily into the appertaining wedge-shaped grooves.

In order to obtain possibly small dimensions of such gearings, as well as a larger range in the change of the speed so that practically no limits exist therefor, two equal gearings can be arranged above one another with parallel position of their axes, their adjusting members for changing the speed being coupled with one another. The speed introduced into the gearing can then be increased or decreased within the same by means of one grip.

The invention is illustrated diagrammatically and by way of example on the accompanying drawing on which Figure 1 is a side-view of a friction speed-change gearing designed according to this invention; Figure 2 is a horizontal section in the line 2—2 of Fig. 1; Figure 3 is an outer view of a modified constructional form of the gearing, the gearing members proper being shown in dotted line; Figure 4 is a horizontal section in the line 4—4 of Fig. 3, and Figure 5 a longitudinal section through another modification, all as fully described hereinafter.

Referring to Figs. 1 and 2, $a$ denotes the casing of the gearing, $b$ the driving shaft, $n$ a bearing-forming socket for this shaft, and $c$ an intermediate cone. The power may be transmitted to the shaft $b$ in any desired manner. The socket $n$ is surrounded by, and coupled with, a turnable eccentric member $d$ in which is guided a slide $e$ combined with a rack $f$ that meshes with a cog-wheel $g$ turnable and adjustable from the outside of the gearing by means of a manually operable grip $h$. Secured to the slide $e$ is a pivot $i$ which is arranged at an angle with respect to the slide and is directed parallel to the shaft $b$. The pivot $i$ carries the transmission wheel which is designed as a double cone, the one conical surface being located opposite to the slide $e$, the other being directed counter thereto. The first-mentioned of these surfaces contacts with the circumferential surface or rim of the cone $c$, the other with the inner rim of the cup-shaped driven wheel $l$ which constitutes a sort of a hollow cone and is likewise supported in the casing $a$ and transmits the power to the place of use.

The change of the ratio of transmission is effected by turning the grip $h$ in the one or the other direction whereby the double cone $k$ will be moved between the transmsision members $c$ and $k$ in the direction of the slide $e$ and the speed will be changed in correspondence with the extent of movement of the slide, this extent being comparatively large, as is, therefore, also the change of the speed. Owing to the member $d$ being eccentrically supported, the bearing socket of the shaft $b$ and the eccentric position of the driven wheel $l$ relatively to said member (see especially Fig. 1) the power transmitting friction wheel $k$ is pressed in a widge-like manner against the driving wheel $c$, as well as against the driven wheel $l$, so that the transmission pressure is the higher, the higher the power is which is to be transmitted.

In the further example illustrated in the Figs. 3 and 4 two double-conical intermediate wheels $k, k$ are arranged diametrically opposite to one another and are supported in eccentrically movable members $d, d$ by the intermediary of slides $e, e$ and pivots $i, i$. The two slides can be moved simultaneously and uniformly by means of the grip $h$, a shaft $h'$ (shown in dotted lines in Fig. 3) to which this grip is affixed, and pairs of worm-wheels $m$, one wheel of each of these pairs being secured to one of the long cog-wheels $g$ which mesh with the racks $f$ of the slides $e$. By turning the grip $h$ the slides can be moved by angles relatively to the solid friction cone $c$ and the hollow friction cone $l$.

While in the Figs. 1 and 2 the eccentric member $d$ surrounds its socket $n$ completely, the eccentric members $d, d$ of Figs. 3 and 4 extend only partly around their common socket $n$ on which they are held in place by ball-bearings, as shown in Fig. 4. Each of the members $d$ is provided with a lateral arm $o$ (shown in dotted lines in Fig. 3), the arms of both members being located opposite to one another, and between them is a helical spring $p$ tending to turn the arms away from one another whereby the two double-conical transmission bodies $k, k$ are forced into the wedge-shaped spaces indicated by hatching in Fig. 3, these spaces being formed thereby that the members $d$ relatively to the shaft $b$ and the conical bodies $k$ likewise relatively to this shaft are eccentrically supported by the same measure. There exist, thus, three eccentric centres which are denoted $x, y$ and $z$.

In the further example illustrated in Fig. 5 two gearings of the constructional form shown in Figs. 1 and 2 are arranged in series, the second gearing being driven by the first. There is an upper shaft $b$ and a lower shaft $b'$ which is a little shifted laterally with respect to the upper shaft. The power transmitted by the upper shaft $b$ and by the solid cone $c$ driven by it is further transmitted from the cone $c$ to the double cone $k$, from this to the inverted hollow cone $l$, further from this cone to the appertaining shaft $b'$ and the solid cone $c'$, then to the second double cone $k'$ to the second inverted hollow cone $l'$ and the shaft of the same. Each double cone, or the appertaining pivot $i$, or $i'$ respectively, is attached to a slide $e$ $(e')$ united with a rack $g$ $(g')$ and guided in an eccentrically turnable member $d$ $(d')$, accurately as in Figs. 1 and 2. The cog-wheels $g$ and $g'$ are coupled with one another by motion-transmitting wheels $q, r$ in a manner similar to the arrangement shown in Figs. 3 and 4 so as to render it possible to operate both said wheels and the other members $(f, f'; e, e'$ etc.) by means of one grip like $h$ (Figs. 3 and 4). As the two eccentric members $d, d'$ are arranged counter to one another, on opposite sides of the appertaining bearing sockets $n, n'$, especially the middle shaft $b'$ is considerably relieved from strain in its socket $m'$.

I claim:

1. A friction change-speed gearing comprising a rotatable driving wheel member, a rotatable driven wheel member, means rotatably supporting said wheel members eccentrically with respect to each other, a rotatable intermediate transmission member having opposed friction surfaces, one of the friction surfaces co-acting with the exterior of the driving wheel member and the other surface co-acting with the interior of the driven wheel member, means for adjusting the intermediate transmission member with respect to the two wheel members, and means mounting the transmission member for rocking movement eccentrically about the axis of one of said wheel members.

2. A friction change-speed gearing as claimed in claim 1 characterized in that the means mounting the transmission member is rotatable about an axis lying between the axes of the driving wheel member and the driven wheel member.

3. A friction speed-change gearing as specified in claim 1, in which two intermediate transmission members are arranged counter to one another and each is attached to a supporting member surrounding the axis of the driving member eccentrically so as to permit to increase or decrease the distance between them and to vary thereby the pressure between the driving and the driven member on the one hand and the transmission members on the other hand.

4. A friction speed-change gearing as specified in claim 1, in which two intermediate transmission members are arranged counter to one another and each is attached to a supporting member surrounding the axis of the driving member eccentrically so as to permit to increase or decrease the distance between them and to vary thereby the pressure between the driving and the driven member on the one hand and the transmission members on the other hand the two eccentrically turnable supporting members of the intermediate transmission members being subject to the action of an additional force tending to move said latter members towards one another in the direction of the narrower portion of the eccentric passage between them on the one hand and the driving and the driven member on the other hand.

5. A friction speed-change gearing as specified in claim 1, in which two intermediate transmission members are arranged counter to one another and each is attached to a supporting member surrounding the axis of the driving member eccentrically so as to permit to increase or decrease the distance between them and to vary thereby the pressure between the driving and the driven member on the one hand and the transmission members on the other hand the two eccentrically turnable transmission members of the intermediate transmission members having laterally directed arms and a spring inserted between said arms and tending to move said latter members towards one another in the direction of the narrower portion of the eccentric passage between these members on the one hand and the driving and the driven member on the other hand.

6. A friction speed-change gearing as specified in claim 1, in which two transmission and speed-change sets are arranged in series in such a manner that the driven member of the first set drives the driving member of the second set.

7. A friction speed-change gearing as specified in claim 1, in which two transmission and speed-change sets are arranged in series in such a manner that the driven member of the first set drives the driving member of the second set, and in which the members for changing the position of the intermediate transmission member of both sets are coupled with one another so as to be operable simultaneously and uniformly from a common place.

8. A friction speed-change gearing as specified in claim 1, in which two transmission and speed-change sets are arranged in series in such a manner that the driven member of the first set drives the driving member of the second set the intermediate transmission members being arranged counter to one another relatively to the bearing-forming sockets to which the eccentrically turnable adjusting members are attached.

KURT BÄR.